United States Patent
You (10) Patent No.: US 11,246,168 B2
(45) Date of Patent: Feb. 8, 2022

(54) METHOD FOR RANDOM ACCESS AND TERMINAL DEVICE

(71) Applicant: GUANGDONG OPPO MOBILE TELECOMMUNICATIONS CORP., LTD., Guangdong (CN)

(72) Inventor: Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 117 days.

(21) Appl. No.: 16/733,961

(22) Filed: Jan. 3, 2020

(65) Prior Publication Data

US 2020/0146074 A1 May 7, 2020

Related U.S. Application Data

(63) Continuation of application No. PCT/CN2018/080044, filed on Mar. 22, 2018.

(51) Int. Cl.
*H04W 4/00* (2018.01)
*H04W 74/08* (2009.01)

(52) U.S. Cl.
CPC ............... *H04W 74/0833* (2013.01)

(58) Field of Classification Search
CPC ................................. H04W 74/0833
USPC ................. 370/329–330, 335–345, 347–348
See application file for complete search history.

(56) References Cited

U.S. PATENT DOCUMENTS

| | | | |
|---|---|---|---|
| 2004/0004973 A1 | 1/2004 | Lee | |
| 2012/0082103 A1* | 4/2012 | Lin | H04W 74/085 370/329 |
| 2012/0275305 A1* | 11/2012 | Lin | H04W 74/0841 370/235 |
| 2013/0170479 A1* | 7/2013 | Fong | H04W 72/0446 370/336 |
| 2013/0242730 A1* | 9/2013 | Pelletier | H04L 1/0046 370/230 |

(Continued)

FOREIGN PATENT DOCUMENTS

| | | |
|---|---|---|
| CN | 101394334 A | 3/2009 |
| CN | 102014516 A | 4/2011 |

(Continued)

OTHER PUBLICATIONS

3GPP TSG-RAN WG2 Meeting #101 R2-1803735; Report from LTE and NR User Plane Break-Out Session, Athens, Greece. Feb. 26-Mar. 2, 2018.

(Continued)

*Primary Examiner* — Thai D Hoang
(74) *Attorney, Agent, or Firm* — Ladas & Parry LLP (57) ABSTRACT

The embodiment of the present application discloses a method for random access and a terminal device. The method includes: a terminal device determines a backoff time of a random access event according to a priority of the random access event, where the random access event with the First priority corresponds to a first backoff time range, a random access event with a second priority corresponds to a second backoff time range, the first priority is higher than the second priority, and the first backoff time range and the second backoff time range do not overlap; and after the backoff time, the terminal device re-initiates the random access procedure.

11 Claims, 3 Drawing Sheets

200

A terminal device determines a backoff time of a random access event according to a priority of the random access event, where the random access event with the first priority corresponds to a first backoff time range, a random access event of a second priority corresponds to a second backoff time range, the first priority is higher than the second priority, and the first backoff time range and the second backoff time range do not overlap — S210

After the backoff time, the terminal device re-initiates a random access procedure. — S220

(56) References Cited

U.S. PATENT DOCUMENTS

| | | | | |
|---|---|---|---|---|
| 2016/0192392 | A1* | 6/2016 | Park | H04W 72/085 370/336 |
| 2018/0184460 | A1* | 6/2018 | Hou | H04W 74/0833 |
| 2018/0324867 | A1* | 11/2018 | Basu Mallick | H04W 72/1284 |
| 2018/0338325 | A1* | 11/2018 | Ryu | H04W 74/085 |
| 2018/0368179 | A1* | 12/2018 | He | H04W 74/008 |
| 2019/0059113 | A1* | 2/2019 | He | H04W 74/0833 |
| 2019/0098540 | A1* | 3/2019 | Lee | H04W 76/11 |
| 2019/0261411 | A1* | 8/2019 | Chin | H04W 74/0833 |

FOREIGN PATENT DOCUMENTS

| | | |
|---|---|---|
| CN | 102291846 A | 12/2011 |
| CN | 102378364 A | 3/2012 |
| CN | 102413580 A | 4/2012 |
| CN | 102625462 A | 8/2012 |
| CN | 106982467 A | 7/2017 |
| CN | 109495977 A | 3/2019 |
| CN | 109587813 A | 4/2019 |
| WO | 2014065593 A1 | 5/2014 |

OTHER PUBLICATIONS

The EESR of corresponding European application No. 18911143.8, dated Jul. 9, 2020.

Intel Corporaton:"Further discussion on differentiation using RA parameters", 3GPP Draft; R2-1802948, 3rd Generation Partnership Project (3GPP), Mobile Competence Centre; 680, Route Des Lucioles: F-06921 Sophia-Antipolis Cedex; France, vol. RAN WG2, no. Athens, Greece; Feb. 26, 2018-Mar. 2, 2018 Feb. 16, 2018(Feb. 16, 2018), XP051408308.

Asustek et al:"Details of prioritized random access for NR", 3GPP Draft; R2-1801430 Details of Prioritized Random Access_V6, 3rd Generation Partnership Project (3GPP), Mobile Competence Centre; 650. Route Des Lucioles; F-06921 Sophia-Antipolis Cedex; France, vol. RAN WG2, no. Vancouver, Canada; Jan. 22, 2018-Jan. 26, 2018 Jan. 12, 2018(Jan. 12, 2018). XP051386839.

Ericsson;"Further discussion on prioritized RACH access". 3GPP Draft; R2-1803192-Further Discussion on Prioritized RACH Access, 3rd Generation Partnership Project (3GPP), Mobile Competence Centre; 650, Route Des Lucioles; F-06921 Sophia-Antipolis Cedex, vol. RAN WG2, no. Athens, Greece; Feb. 26, 2018-Mar. 2, 2018 Feb. 15, 2018(Feb. 15, 2018), XP051399950.

"3rd Generation Partnership Project; Technical Specification Group Radio Access Network: NR, Medium Access Control(MAC) Protocol specification (Release 15)", 3GPP Standard; Technical Specification; 3GPP TS 38.321, 3rd Generation Partnership Project (3GPP), Mobile Competence Centre; 650, Route Des Lucioles; F-06921 Sophia-Antipolis Cedex; France, vol. RAN WG2, no. V15.0.0. Jan. 4, 2018(Jan. 4, 2018), XP051392362.

International Search Report (ISR) with an English translation dated Dec. 27, 2018 for Application No. PCT/CN2018/080044.

The Second Office Action of corresponding Chinese application No. 201880003201.3, dated Apr. 2, 2020.

The first Office Action of corresponding Indian application No. 202017042578, dated Dec. 3, 2021.

* cited by examiner

A terminal device determines a backoff time of a random access event according to a priority of the random access event, where the random access event with the first priority corresponds to a first backoff time range, a random access event of a second priority corresponds to a second backoff time range, the first priority is higher than the second priority, and the first backoff time range and the second backoff time range do not overlap — S210

After the backoff time, the terminal device re-initiates a random access procedure. — S220

A terminal device determines a backoff time of a random access event according to a priority of the random access event, where the random access event with the first priority and the random access event with the second priority correspond to a same backoff time range, and the first priority is higher than the second priority — S310

After the backoff time, the terminal device re-initiates a random access procedure. — S320

FIG. 7

METHOD FOR RANDOM ACCESS AND TERMINAL DEVICE

CROSS-REFERENCE TO RELATED APPLICATIONS

This application is a continuation of International Application No. PCT/CN2018/080044, filed on Mar. 22, 2018, the disclosure of which is hereby incorporated by reference in its entirety.

TECHNICAL FIELD

Embodiments of the present application relate to the field of communications and in particular, relates to a method for random access and a terminal device.

BACKGROUND

In a long term evolution (LTE) system, a network may indicate a time range that a terminal device needs to wait to retransmit a random access preamble, though a backoff indicator (BI). After the terminal device fails to receive a random access response (RAR), or after the terminal device receives the fourth message of random access (i.e. Msg4) and determines the failure of competition resolution according to the Msg4, a time may be randomly selected between 0 and BI, and a random access procedure is re-initiated after the time.

According to a discussion of the 3rd Generation Partnership Project (3GPP), it is determined that random access caused by handover and beam failure recovery (BFR) has a higher priority, and therefore the random access procedure with at high priority can be optimized. Specifically, for the selection of a backoff time for a random access event with a high priority, a concept of scaling factor is introduced, and the backoff time of a random access event with a high priority can be determined according to BI* scaling factor, that is, the backoff time of the random access procedure with the high priority can be selected from 0 to BI* scaling factor, and the backoff time of a random access event with a low priority is still selected between 0 and BI. In this case, in 0~BI* scaling factor, conflict still occurs between a random access with a high priority and a random access with a low priority.

SUMMARY

A method for random access and a terminal device are provided, which can avoid conflicts between random access events of different priorities.

In a first aspect, a method for random access is provided, including: determining, by a terminal device, a backoff time of a random access event according to a priority of the random access event, where the random access event with the first priority corresponds to a first backoff time range, a random access event of a second priority corresponds to a second backoff time range, the first priority is higher than the second priority, and the first backoff time range and the second backoff time range do not overlap; and re-initiating, by the terminal device, a random access procedure after the backoff time.

Therefore, according to the method for random access in the embodiment of the present application, random access events of different priorities may correspond to different backoff time ranges, thereby facilitating avoidance of the conflict problem among random access events of different priorities when the random access is re-initiated.

In some possible implementations, a maximum backed time of the first backoff time range is K*T, and a minimum backoff tune of the second backoff time range is greater than or equal to K*T where 0<K<1, and T is indicated by the network device through a backoff indicator (BI).

In some possible implementations, the determining, by a terminal device, a backoff time of a random access event, according to a priority of the random access event, includes:

if the priority of the random access event is the first priority, randomly selecting, by the terminal device, a first time between 0 and K*T, and taking a time value obtained after the first time is multiplied by a scaling factor as the backoff time of the random access event.

For example, an upper limit of the first backoff time range may be K*T, and a lower limit of the first backoff time range may be 0, for a random access event with a high priority, the terminal device may randomly select a T1 between 0~K*T, and determine the time value obtained by T1*factor as the backoff time of the random access event.

In some possible implementations, the scaling factor is configured by the network device, and is used to adjust the backoff time of the random access event with the first priority, the scaling factor is a positive number less than 1.

In some possible implementations, the determining, by the terminal device, a backoff time of a random access event, according to a priority of the random access event, includes:

if the priority of the random access event is the second priority, randomly selecting, by the terminal device, a second time between K*T and T as the backoff time of the random access event.

That is to say, the upper limit of the first backoff time range may be K*T, the lower limit of the first backoff time range may be 0, and a lower limit of the second backoff time range may be K*T, and an upper limit of the second backoff time range may be T. In this way, random access events of different priorities correspond to different backoff time ranges, and therefore, for the random access events of different priorities, the backoff time ranges of the determined backoff times are also different, which could avoid the conflict problem among random access events of different priorities.

In an embodiment, K is configured by the network device.

In an embodiment, K is ½.

In some possible implementations, the maximum backoff time of the first backoff time range is f*T, and the minimum backoff time of the second backoff time range is greater than or equal to the f*T, where 0<f<1, T is indicated by the network device through the backoff indicator (BI), and f is a scaling factor configured by the network device.

In some possible implementations, the determining, by the terminal device, a backoff time of a random access event, according to a priority of the random access event, includes:

if the priority of the random access event is the first priority, randomly selecting, by the terminal device, a third time between 0 and f*T as the backoff time of the random access event.

In some possible implementations, the determining, by the terminal device, a backoff time of a random access event, according to a priority of the random access event, includes:

if the priority of the random access event is the second priority, randomly selecting, by the terminal device, a fourth time between f*T and T as the backoff time of the random access event.

That is to say, the upper limit of the first backoff time range may be f*T, the lower limit of the first backoff time range may be 0, and the lower limit of the second backoff time range may be f*T, the upper limit of the second backoff time range may be T. In this way, the random access events of different priorities correspond to different backoff time ranges, and therefore, for random access events of different priorities, the backoff time ranges of the determined backoff times are also different, which could avoid the conflict problem among random access events of different priorities.

In some possible implementations, the random access event with the first priority includes random access caused by handover and beam failure recovery (BFR), and the random access event with the second priority includes random access events other than the random access event with the first priority.

In a second aspect, a method for random access is provided, including:

determining, by the terminal device, a backoff time of a random access event, according to a priority of the random access event, where the random access event with the first priority and a random access event of a second priority correspond to a same backoff time range, and the first priority is higher than the second priority; and re-initiating, by the terminal device, a random access procedure after the backoff time.

Therefore, although the random access events of different priorities may correspond to the same backoff time range, the terminal device may determine the backoff time of the random access event according to the priority of the random access event in combination with the same backoff time range. For example, for a random access event with a higher priority, the terminal device may randomly select a time value within the backoff time range, and then multiply the time value by a specific scaling factor (less than 1) to obtain a time value, which is determined as the backoff time of the random access event, or for a random access event with a lower priority, the terminal device may randomly select a time value within the backoff time range, which is determined as the backoff time of the random access event, so that the random access event with the high priority can re-initiate random access as soon as possible, and at the same time, although the random access events of different priorities correspond to the same backoff time range, since the backoff times are determined in different specific ways, the conflict problem among random access events of different priorities can also be reduced to some extent.

In some possible implementations, a maximum backoff time of the same backoff time range is T, and T is indicated by a network device through a backoff indicator (BI).

In some possible implementations, the determining, by the terminal device, a backoff time of a random access event, according to a priority of the random access event, includes:

if the priority of the random access event is the first priority, randomly selecting, by the terminal device, a fifth time between 0 and T, and taking a time value obtained after the fifth time is multiplied by a scaling factor as the backoff time of the random access event.

In some possible implementations, the scaling factor is configured by the network device, and is used to adjust the backoff time of the random access event with the first priority, and the scaling, factor is a positive number less than 1.

In some possible implementations, the determining, by the terminal device, a backoff time of a random access event, according to a priority of the random access event, includes:

if the priority of the random access event is the second priority, randomly selecting, by the terminal device, a sixth time between 0 and T as the backoff time of the random access event.

In some possible implementations, the random access event with the first priority includes random access caused by handover and beam failure recovery (BFR), and the second priority random access event includes random access events other than the random access event with the first priority.

In a third aspect, a terminal device is provided for performing the method of the above first aspect or any of the possible implementations of the first aspect. In particular, the terminal device includes units for performing the method of the above first aspect or any of the possible implementations of the first aspect.

In a fourth aspect, a terminal device is provided. The terminal device includes: a memory, a processor, an input interface, and an output interface, and the memory, the processor, the input interface, and the output interface are connected by a bus system. The memory is configured to store instructions, the processor is configured to perform instructions that are stored in the memory to perform the method of above first aspect or any of the possible implementations of the first aspect.

In a fifth aspect, a terminal device is provided for performing the method of the above second aspect or any of the possible implementations of the second aspect. In particular, the terminal device includes units for performing, the method of the above second aspect or any of the possible implementations of the second aspect.

In a sixth aspect, a terminal device is provided. The terminal device includes: a memory, a processor, an input interface, and an output interface, and the memory, the processor, the input interface, and the output interface are connected by a bus system. The memory is configured to store instructions, the processor is configured to perform instructions that are stored in the memory to perform the method of above second aspect or any of the possible implementations of the second aspect.

In a seventh aspect, a computer storage medium is provided for storing computer software instructions that are used to perform the method of the above first aspect or any of the possible implementations of the first aspect, which includes a program designed to perform the above aspects.

In an eighth aspect, a computer program product including instructions is provided, which when running on a computer, enables the computer to perform the method of the above first aspect or any of the possible implementations of the first aspect.

In a ninth aspect, a computer storage medium is provided for storing computer software instructions that are used to perform the method of the above second aspect or any of the possible implementations of the second aspect, which includes a program designed to perform the above aspects.

In a tenth aspect, a computer program product including instructions is provided, which when running on a computer, enables the computer to perform the method of the above second aspect or any of the possible implementations of the second aspect.

DETAILED DESCRIPTION OF THE EMBODIMENTS

The technical solutions in the embodiments of the present application will be described in the following with reference to the accompanying drawings.

The technical solutions in the embodiments of the present application can be applied to various communication systems, such as a long term evolution (LTE) system, an LTE frequency division duplex (FDD) system, and an LTE time division duplex (TDD) or future 5G system.

Figure 1:
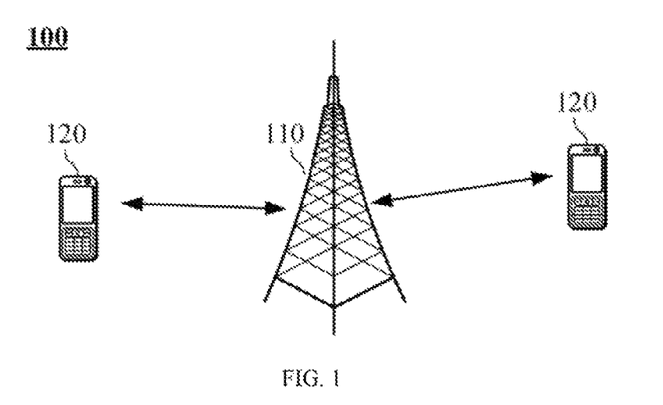
FIG. 1 shows a schematic diagram of an application scenario according to an embodiment of the present application.

FIG. 1 shows a wireless communication system 100 applied in an embodiment of the present application. The wireless communication system 100 may include a network device 110. The network device 100 may be a device that communicates with a terminal device. The network device 100 may provide communication coverage for a specific geographic area and may communicate with a terminal device (e.g., UE) located in the coverage area. In an embodiment, the network device 100 may be an evolutional Node B (eNB or eNodeB) in the LTE system, or the network device may be a relay station, an access point, the in-vehicle equipment, the wearable equipment, and a network side device of the future 5G network or a network device in a future evolutional public laud mobile network (PLMN).

The wireless communication system 100 also includes at least one terminal device 120 located in the coverage of the network device 110. The terminal device 120 can be mobile or fixed. In an embodiment, the terminal device 120 may refer to an access terminal, the user equipment (UE), a user unit, a user station, a mobile station, a mobile platform, a remote station, a remote terminal, the mobile equipment, a user terminal, a terminal, and the wireless communication equipment, a user agent, or a user device. The access terminal may be a cellular phone, a cordless phone, a session initiation protocol (SIP) phone, a wireless local loop (WLL) station, a personal digital assistant (PDA), an handheld equipment with wireless communication functions, a computing equipment or other processing equipment connected to wireless modems, an in-vehicle equipment, a wearable equipment, a terminal device in a future 5G network, or a terminal device in a future evolutional PLMN, and the like.

Figure 2:
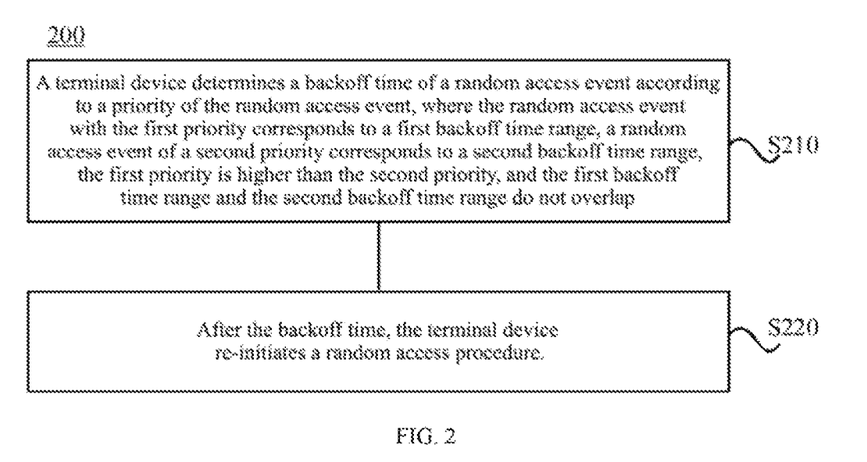
FIG. 2 shows a schematic flowchart of a method for random access according to an embodiment of the present application.

FIG. 2 is a schematic flowchart of a method 200 for random access according to an embodiment of the present application. The method 200 may be performed by the terminal device in the communication system shown in FIG. 1. As shown in FIG. 2, the method 200 includes:

S210, a terminal device determines a backoff time of a random access event according to a priority of the random access event, where the random access event with the first priority corresponds to a first backoff time range, a random access event of a second priority corresponds to a second backoff time range, the first priority is higher than the second priority, and the first backoff time range and the second backoff time range do not overlap;

S220, after the backoff time, the terminal device re-initiates a random access procedure.

Therefore, according to the method for random access in the embodiment of the present application, random access events of different priorities may correspond to different backoff time ranges, thereby facilitating avoidance of the conflict problem among random access events of different priorities when the random access is re-initiated.

It should be understood that, in the embodiment of the present application, the backoff time is a waiting time from a random access failure to a next re-initiation of the random access, and in an embodiment, the terminal device determines the random access fail when it does not receive a RAR or when it receives a Msg4 and determines the failure of competition resolution according to the Msg4.

In an embodiment of the present application, the random access event with the first priority may, include random access caused by handover and beam failure recovery (BFR), and the random access event with the second priority includes random access events other than the random access event with the first priority, where the random access event with the first priority has a higher priority.

In an embodiment of the present application, the random access event with the first priority corresponds to the first backoff time range, the random access event with the second priority corresponds to the second backoff time range, and the first backoff time range and the second backoff time range do not overlap.

Here, the first backoff time range and the second backoff time range do not overlap, which may be that the first backoff time range and the second backoff time range do not overlap at all, for example, the first backoff time range is 0~T/3, while the second backoff time range is T/2~T, or may be that the first backoff time range and the second backoff time range overlap at an endpoint position, for example, the first backoff time range is 0~T/2, the second backoff time range is T/2~T.

In some embodiments, the maximum backoff time of the first backoff time range may be less than or equal to the minimum backoff time of the second backoff time range, that is the backoff time of the random access event with a high priority is shorter, so that the random access event with the high priority can re-initiate random access as soon as possible, and therefore, access time delay can be reduced and user experience can be improved.

Hereinafter, manners for determining the backoff time will be described in detail with reference to the first embodiment and the second embodiment.

Embodiment 1: the maximum backoff time of the first backoff time range is K*T, and the minimum backoff time of the second backoff time range is greater than or equal to the K*T, where 0<K<1, and T is indicated by the network device through a backoff indicator (BI).

Specifically, the terminal device may determine a duration T according to the BI sent by the network device. Further, the terminal device may use a duration obtained by multiplying the duration T by a scaling factor K*T as the maximum backoff time of the random access event with the high priority (that is, K*T). In order to enable the random access event with the high priority to re-initiate random access as soon as possible, it may take 0<K<1. At the same time, the minimum backoff time of the second backoff time range may be set to be greater than or equal to K*T, so that the backoff times of random access events of different priorities do not overlap, and then the conflict problem among random access events of different priorities can be avoided.

In an embodiment of the present application, the K may be configured by a network, or agreed by a protocol, which is not limited in the embodiment of the present application.

In some embodiments, K may be ½, or ⅓, and so on, which is not limited in the embodiment of the present application.

In some embodiments, S210 may include:

if the priority of the random access event is the first priority, the terminal device randomly selects a first time between 0 and K*T, and takes a time value obtained after the first time is multiplied by a scaling factor, factor, as the backoff time of the random access event.

That is, the upper limit of the first backoff time range may be K*T, and the lower limit of the first backoff time range may be 0. If the priority of the random access event is the high priority, the terminal device randomly selects a first time between 0 and K*T, marked as BT1, and then takes the time value obtained by multiplying BT1 by factor as the backoff time of the random access event.

In an embodiment of the present application, the scaling factor is configured by a network device, or agreed by a protocol, and the scaling factor may be used to adjust the backoff time of the random access event with the first priority, and the scaling factor is a positive number less than 1.

In other embodiments, S210 may include:

if the priority of the random access event is the second priority, the terminal device randomly selects a second time between the K*T and T as the backoff time of the random access event.

That is, the lower limit of the second backoff time range may be K*T, the upper limit of the second backoff time range may be T. If the priority of the random access event is the low priority, the terminal device randomly selects a second time between the K*T and T marked as BT2, and further may take BT2 as the backoff time of the random access event.

In the embodiment 1, since the random access events of different priorities correspond to different backoff time ranges, therefore, for the random access events of different priorities, the backoff time ranges of the determined backoff times are also different, which could avoid the conflict problem between random access events of different priorities.

Embodiment 2: the maximum backoff time of the first backoff time range is f*T, and the minimum backoff time of the second backoff time range is greater than or equal to the f*T, where 0<f<1, T is indicated by the network device through the backoff indicator (BI), and f is a scaling factor configured by the network device.

Here, the f may correspond to the scaling factor, factor, described above, that is, in the embodiment 2, the upper limit of the first backoff time range may be the product of the duration T and the scaling factor f determined according to BI, the lower limit of the second backoff time range may be greater than or equal to the product of the duration T and the scaling factor f and therefore, the first backoff time range and the second backoff time range may respectively correspond to different backoff time ranges, thereby facilitating avoidance of the conflict problem between random access events of different priorities.

In some embodiments, S210 may include:

if the priority of the random access event is the first priority, the terminal device randomly selects a third time between 0 and as the backoff time of the random access event.

That is, when the priority of the random access event is the high priority, the terminal device may randomly select a third time between 0 and f*T as the backoff time of the random access event.

In other embodiments, S210 may include:

if the priority of the random access event is the second priority, the terminal device randomly selects a fourth time between f*T and T as the backoff time of the random access event.

That is, when the priority of the random access event is the low priority, the terminal device may randomly select a fourth time between f*T and T as the backoff time of the random access event.

In the embodiment 2, since the random access events of different priorities correspond to different backoff time ranges, therefore, for the random access events of different priorities, the backoff time ranges of the determined backoff times are also different, and thereby the conflict problem between random access events of different priorities can be avoided.

It should be understood that in the above embodiment 1 and embodiment 2, the backoff time ranges corresponding to the random access events of different priorities are only examples, the first backoff time range and the second backoff time range may also be other time ranges, and the embodiments of the present application do not constitute any limitation.

Figure 3:
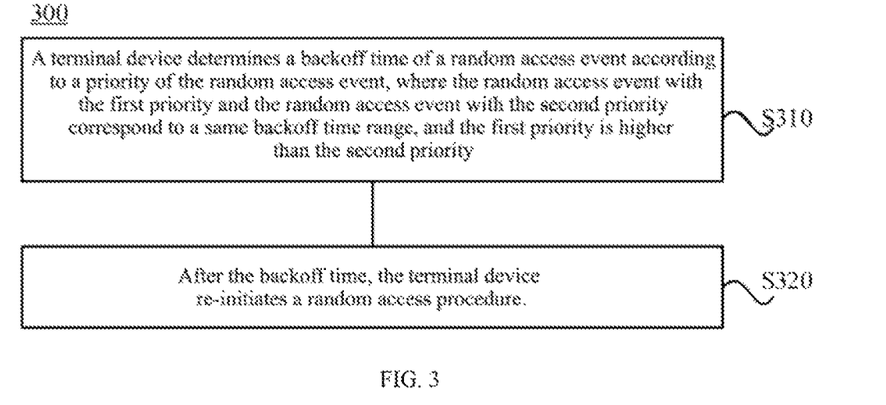
FIG. 3 shows a schematic flowchart of a method for random access according to another embodiment of the present application.

FIG. 3 is a schematic flowchart of a method 300 for random access according to another embodiment of the present application, the method 300 may be performed by the terminal device in the communication system shown in FIG. 1, and as shown in FIG. 3, the method 300 includes the following contents:

S310, a terminal device determines a backoff time of a random access event according to a priority of the random access event, where the random access event with the first priority and the random access event with the second priority correspond to a same backoff time range, and the first priority is higher than the second priority;

S320, after the backoff time, the terminal device re-initiates a random access procedure.

In the embodiment, the random access events of different priorities may correspond to the same backoff time range, the terminal device may determine the backoff time of the random access event according to the priority of the random access event in combination with the same backoff time range. For example, for the random access event with the higher priority, the terminal device may randomly select a time value within the backoff time range, and then multiply the time value by a specific scale factor (less than 1) to obtain a time value, which is determined as the backoff time of the random access event, or for the random access event with the lower priority, the terminal device may randomly select a time value within the backoff time range, which is determined as the backoff time of the random access event, so that the random access event of the high priority can re-initiate random access as soon as possible, and at the same time, although the random access events of different priorities correspond to the same backoff time range, since the backoff times are determined in different specific ways, the conflict problem between random access events of different priorities can also be reduced to some extent.

In some embodiments, the maximum backoff time of the same backoff time range is T, and T is indicated by a network device through a backoff indicator (M).

In some embodiments, the determining, by a terminal device, a backoff time of a random access event according to a priority of the random access event, includes:

if the priority of the random access event is the first priority, the terminal device randomly selects a fifth time between 0 and T, and takes a time value obtained after the fifth time is multiplied by a scaling factor as the backoff time of the random access event.

In some embodiments, the scaling factor is configured by a network device, and is used to adjust the backoff time of the random access event with the first priority, and the scaling factor, is a positive number less than 1.

The scaling factor here may correspond to the factor mentioned above, and the specific implementation process is similar, which will not be repeated here.

In other embodiments, S310 may include:

if the priority of the random access event is the second priority, the terminal device randomly selects a sixth time between 0 and T as the backoff time of the random access event.

In an embodiment of the present application, the random access event with the first priority includes random access caused by handover and beam failure recovery (BFR), and the second priority random access event includes random access events other than the random access event with the first priority.

The method embodiments of the present application are described in detail in the above with reference to FIG. 2 and FIG. 3, and the device embodiments of the present application will be described in detail below with reference to FIG. 4 to FIG. 7. It should be understood that the device embodiments and the method embodiments correspond to each other, and reference may be made to the method embodiments for similar description.

Figure 4:
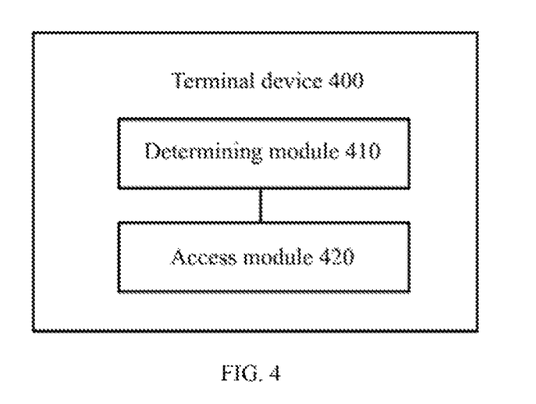
FIG. 4 shows a schematic block diagram of a terminal device according to an embodiment of the present application.

FIG. 4 shows a schematic block diagram of a terminal device 400 according to an embodiment of the present application. As shown in FIG. 4, the terminal device 400 includes:

a determining module 410, configured to determine a backoff time of a random access event according to a priority of the random access event, where the random access event with the first priority corresponds to a first backoff time range, and a random access event with a second priority corresponds to a second backoff time range, the first priority is higher than the second priority, and the first backoff time range and the second backoff time range do not overlap; and an access module 420, configured to re-initiate a random access procedure after the backoff time.

In some embodiments, a maximum backoff time of the first backoff time range is K*T, where 0<K<1, T is indicated by a network device through a backoff indicator (BI), and a minimum backoff time of the second backoff time range is greater than or equal to K*T.

In some embodiments, the determining module 410 is specifically configured to:

if the priority of the random access event is the first priority, randomly select a first time between 0 and K*T, and take a time value obtained after the first time is multiplied by a scaling factor as the backoff time of the random access event.

In some embodiments, the scaling factor is configured by the network device, and used to adjust the backoff time of the random access event with the first priority, and the scaling factor is a positive number less than 1.

In some embodiments, the determining module 410 is further configured to:

if the priority of the random access event is the second priority, randomly select a second time between the K*T and T as the backoff time of the random access event.

In some embodiments, K is configured by the network device.

In some embodiments, K is ½.

In some embodiments, the maximum backoff time of the first backoff time range is f*T, and the minimum backoff time of the second backoff time range is greater than or equal to the f*T, where 0<f<1, T is indicated by the network device through a backoff indicator (BI), and f is a scaling factor configured by the network device.

In some embodiments, the determining module 410 is further configured to:

if the priority of the random access event is the first priority, randomly select a third time between 0 and the f*T as the backoff time of the random access event.

In some embodiments, the determining module 410 is further used to:

if the priority of the random access event is the second priority, randomly select a fourth time between f*T and T as the backoff time of the random access event.

In some embodiments, the random access event with the first priority includes random access caused by handover and beam failure recovery (BFR), and the random access event with the second priority includes random access events other than the random access event with the first priority.

It should be understood that the terminal device 400 according to the embodiment of the present application may correspond to the terminal device in the method embodiments of the present application, and the above and other operations and/or functions of the units in the terminal device 400 are respectively for implementing the corresponding processes of the terminal device in the method 200 shown in FIG. 2, and are not repeated here for brevity.

Figure 5:
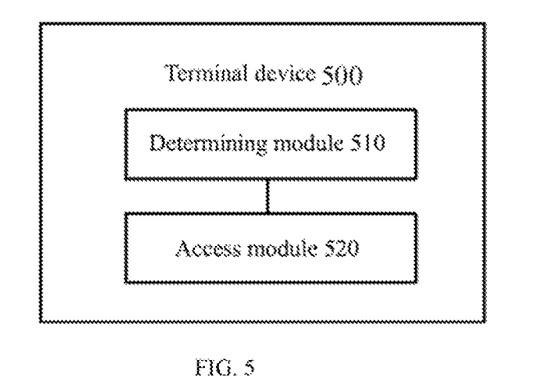
FIG. 5 shows a schematic block diagram of a terminal device according to another embodiment of the present application.

FIG. 5 is a schematic block diagram of a terminal device according to another embodiment of the present application. The terminal device 500 in FIG. 5 includes:

a determining module 510, configured to determine a backoff time of a random access event according to a priority of the random access event, where the random access event with the first priority and the random access event with the second priority correspond to a same backoff time range, and the first priority is higher than the second priority; and an access module 520, configured to re-initiate a random access procedure after the backoff time.

In some embodiments, a maximum backoff time of the same backoff time range is T, and T is indicated by a network device through a backoff indicator (BI).

In some embodiments, the determining module 510 is specifically configured to:

if the priority of the random access event is the first priority, randomly select a fifth time between 0 and T, and take a time value obtained after the fifth time is multiplied by a scaling factor as the backoff time of the random access event.

In some embodiments, the scaling factor is configured by a network device, and used to adjust the backoff time of the random access event with the first priority, and the scaling factor is a positive number less than 1.

In some embodiments, the determining module 510 is further configured to:

if the priority of the random access event is the second priority, randomly select a sixth time between 0 and the T as the backoff time of the random access event.

In some embodiments, the random access event with the first priority includes random access caused by handover and beam tin lure recovery (BFR), and the random access event with the second priority includes random access events other than the random access event with the first priority.

Specifically, the terminal device 500 may correspond to (for example, may be configured in or be itself) the terminal device described in the above method 300, and the modules or units in the terminal device 500 are respectively configured to perform the actions or processes performed by the terminal device in the foregoing method 300. Here, in order to avoid repeating, detailed description is omitted.

Figure 6:
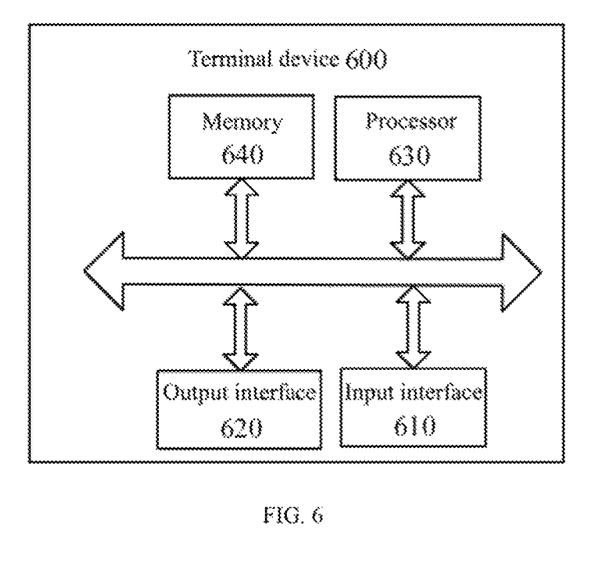
FIG. 6 shows a schematic block diagram of a terminal device according to an embodiment of the present application.

As shown in FIG. 6, an embodiment of the present application further provides a terminal device 600, which may be the terminal device 400 in FIG. 4, and which can be configured to perform the content of the terminal device corresponding to the method 200 in FIG. 2. The terminal device 600 includes: an input interface 610, an output interface 620, a processor 630, and a memory 640. The input interface 610, the output interface 620, the processor 630, and the memory 640 may be connected by a bus system. The memory 640 is configured to store a program, instructions or code. The processor 630 is configured to pert the program, instructions or code in the memory 640 to control the input interface 610 to receive a signal, control the output interface 620 to transmit a signal, and complete the operations in the foregoing method embodiments.

It should be understood that, in the embodiment of the present application, the processor 630 may be a central processing unit (CPU), and the processor 630 may also be other general-purpose processors, digital signal processors (DSP), application specific integrated circuit (ASIC), field programmable gate array (FPGA) or other programmable logic devices, discrete gate or transistor logic devices, discrete hardware components, and so on. The general purpose processor may be a microprocessor or the processor may also be any conventional processors, and so on.

The memory 640 may include read-only memory and random access memory, and provides instructions and data to the processor 630. A part of the memory 640 may also include non-volatile random access memory. For example, the memory 640 can also store information of a type of a device.

In an implementation process, the contents of the above method may be completed by an integrated logic circuit of hardware in the processor 630 or an instruction in a form of software. The contents of the method disclosed in the embodiments of the present application may be directly performed by a hardware processor, or may be performed by a combination of hardware and software modules in the processor. The software module can be located in a mature storage medium in the art, such as a random access memory, a flash memory, a read-only memory, a programmable read-only memory or an electrically erasable programmable memory, a register, or the like. The storage medium is located in the memory 640, the processor 630 reads information in the memory 640 and completes the contents of the above method in combination with its hardware. To avoid repetition, it will not be described in detail here.

In a specific implementation, the determining module 410 included in the terminal device 400 in FIG. 4 may be implemented by the processor 630 in FIG. 6. The access module 420 included in the terminal device 400 in FIG. 4 may be implemented by the input interface 610 and the output interface 620 in FIG. 6.

Figure 7:
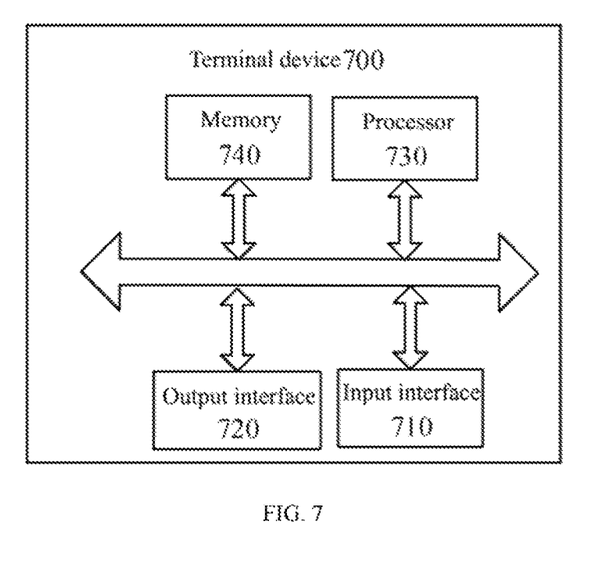
FIG. 7 shows a schematic block diagram of a terminal device according to another embodiment of the present application.

As shown in FIG. 7, an embodiment of the present application further provides a terminal device 700, and the terminal device 700 may be the terminal device 500 in FIG. 5, which can be used to perform the content of the terminal device corresponding to the method 300 in FIG. 3, The terminal device 700 includes an input interface 710, an output interface 720, a processor 730, and a memory 740. The input interface 710, the output interface 720, the processor 730, and the memory 740 may be connected through a bus system. The memory 740 is configured to store a program, instructions or code. The processor 730 is configured to perform the program, instructions or code in the memory 740 to control the input interface 710 to receive a signal, control the output interface 720 to transmit a signal, and complete the operations in the foregoing method embodiments.

It should be understood that in the embodiment of the present application, the processor 730 may be a central processing unit (CPU), the processor 730 may also be other general purpose processors, digital signal processor (DSP), application specific integrated circuit (ASIC), field programmable gate array (FPGA) or other programmable logic devices, discrete gate or transistor logic devices, discrete hardware components, and so on. The general-purpose processor may be a microprocessor or the processor may also be any conventional processors, and so on.

The memory 740 may include a read-only memory and a random access memory, and provides instructions and data to the processor 730. A part of the memory 740 may also include a non-volatile random access memory. For example, the memory 740 can also store information of a type of a device.

In the implementation process, the content the above method may be completed by an integrated logic circuit of hardware in the processor 730 or an instruction in a form of software. The content of the method disclosed in the embodiments of the present application may be directly performed by a hardware processor, or may be performed by a combination of hardware and software modules in the processor. The software module can be located in a mature storage medium such as a random access memory, a flash memory, a read-only memory, a programmable read-only memory or an electrically erasable programmable memory, a register, or the like. The storage medium is located in the memory 740, the processor 730 reads information in the memory 740 and completes the contents of the above method in combination with its hardware. To avoid repetition, it will not be described in detail here.

In a specific implementation, the determining module 510 included in the terminal device 500 in FIG. 5 may be implemented by the processor 730 in FIG. 7. The access module 520 included in the terminal device 500 in FIG. 5 may be implemented by the input interface 710 and the output interface 720 in FIG. 7.

An embodiment of the present application further proposes a computer readable storage medium that stores one or more programs, the one or more programs including instructions, the instructions when being performed by a portable electronic device that includes multiple applications, can cause the portable electronic device to perform the method of the embodiments shown in FIG. 2 and FIG. 3.

An embodiment of the present application also proposes a computer program that includes instructions, the computer program when being performed by a computer, causes the computer to perform the corresponding flow of the method of the embodiments shown in FIG. 2 and FIG. 3.

Those ordinary skilled in the art will realize that the units and algorithm steps of the various examples described in combination with the embodiments disclosed herein can be implemented by electronic hardware or a combination of computer software and electronic hardware. Whether these functions are performed in hardware or software depends on the specific application and design constraint condition of the technical solution. Professional skilled in the art can use different methods to implement the described functions for each particular application, but such implementation should not be, considered beyond the scope of the present application.

Those skilled in the art can clearly understand that for the convenience and brevity of the description, the specific working process of the system, the device and the unit described above can refer to the corresponding process in the foregoing method embodiment, and will not be repeated herein.

In the several embodiments provided by the present application, it should be understood that the disclosed systems, devices, and methods may be implemented in other ways. For example, the device embodiments described above are merely illustrative, for example, the division of the unit is only a logical function division, in an actual implementation, there may be other division manners, for example, multiple units or components may be combined or may be integrated into another system, or some features may be ignored or not performed. On the other hand, the mutual coupling or direct coupling or communication connection shown or discussed may be an indirect coupling or communication connection through some interfaces, devices or units, and may be electrical, mechanical or other forms.

The units described as separate components may or may not be physically separated, and the components displayed as units may or may not be physical units, that is, may be located in one place, or may be distributed to multiple network units. Some or all of the units may be selected according to actual needs to achieve the purpose of the scheme of the embodiment.

In addition, each functional unit in each embodiment of the present application may be integrated into one processing unit, or each unit may exist physically separately, or two or more units may be integrated into one unit.

This function can be stored on a computer readable storage medium, if the function is implemented in a software function unit form and sold or used as an independent product. Based on such understanding, the technical solution of the present application in essence, or a part that contributes to the prior an, or a part of the technical solution, may be embodied in the form of a software product, which is stored in a storage medium, including a number of instructions which are used to cause a computer equipment (which may be a personal computer, server, or network device, etc.) to perform all or part of the steps of each embodiment of the present application. The foregoing storage medium includes: a U disk, a mobile hard disk, a Read-Only Memory (ROM), a Random Access Memory (RAM), a magnetic disk, or an optical disk, and the like, which can store program code.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the technical solutions.

What is claimed is:

1. A method for random access, comprising:
   determining, by a terminal device, a backoff time of a random access event according to a priority of the random access event, wherein a random access event with a first priority corresponds to a first backoff time range, a random access event with a second priority corresponds to a second backoff time range, the first priority is higher than the second priority, and the first backoff time range and the second backoff time range do not overlap; and
   re-initiating, by the terminal device, a random access procedure after the backoff time;
   wherein a maximum backoff time of the first backoff time range is K×T, wherein K is a scaling factor, 0<K<1, and T is a duration and is indicated by a network device through a backoff indicator (BI);
   wherein the determining, by a terminal device, a backoff time of a random access event according to a priority of the random access event, comprises:
   if the priority of the random access event is the first priority, randomly selecting, by the terminal device, a first time between 0 and K×T, and taking a time value obtained after the first time is multiplied by a scaling factor as the backoff time of the random access event.

2. The method according to claim 1, wherein a minimum backoff time of the second backoff time range is greater than K×T.

3. The method according to claim 1, wherein the scaling factor is configured by the network device, and is used to adjust the backoff time of the random access event with the first priority, and the scaling factor is a positive number less than 1.

4. The method according to claim 2, wherein the determining, by a terminal device, a backoff time of a random access event according to a priority of the random access event, comprises:
   if the priority of the random access event is the second priority, randomly selecting, by the terminal device, a second time between K×T and T as the backoff time of the random access event.

5. A terminal device, wherein the terminal device comprises: a memory, a processor and an output interface, the processor is connected with the memory and the output interface, and the memory stores instructions, which when executed by the processor cause the processor to:
   determine a backoff time of a random access event according to a priority of the random access event, wherein the random access event with the first priority corresponds to a first backoff time range, and a random access event with a second priority corresponds to a second backoff time range, the first priority is higher than the second priority, and the first backoff time range and the second backoff time range do not overlap; and
   control the output interface to re-initiate a random access procedure after the backoff time;
   wherein a maximum backoff time of the first backoff time range is K×T, wherein K is a scaling factor, 0<K<1, T is a duration and is indicated by a network device through a backoff indicator (BI);
   wherein the instructions cause the processor to:
   if the priority of the random access event is the first priority, randomly select a first time between 0 and K×T, and take a time value obtained after the first time is multiplied by a scaling factor as the backoff time of the random access event.

6. The terminal device according to claim 5, wherein a minimum backoff time of the second backoff time range is greater than K×T.

7. The terminal device according to claim 6, wherein the instructions further cause the processor to:
if the priority of the random access event is the second priority, randomly select a second time between K×T and T as the backoff time of the random access event.

8. The terminal device according to claim 6, wherein K is configured by the network device.

9. The terminal device according to claim 6, wherein K is ½.

10. The terminal device according to claim 5, wherein the scaling factor is configured by the network device, and is used to adjust the backoff time of the random access event with the first priority, and the scaling factor is a positive number less than 1.

11. The terminal device according to claim 5, wherein the random access event with the first priority includes random access event caused by handover and beam failure recovery (BFR), and the random access event with the second priority includes random access events other than the random access event caused by handover and BFR.

\* \* \* \* \*